No. 766,035. PATENTED JULY 26, 1904.
J. C. HANSEN-ELLEHAMMER.
MACHINE FOR MAKING CIGARETTE TUBES.
APPLICATION FILED JAN. 25, 1902.
NO MODEL. 5 SHEETS—SHEET 4.
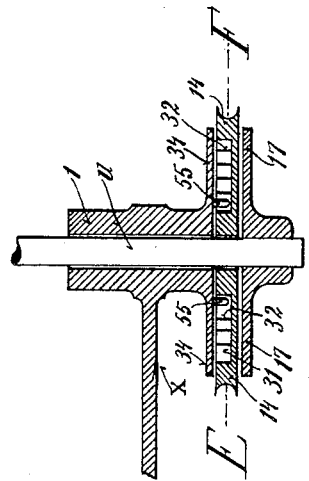
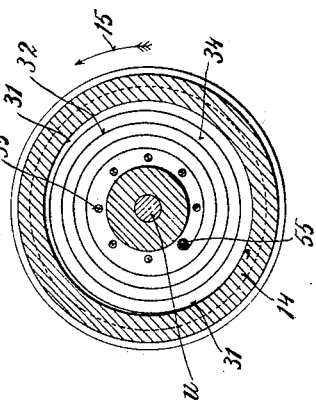
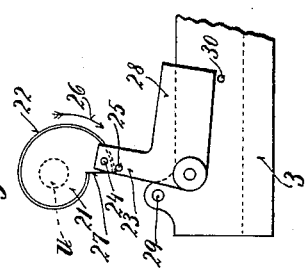
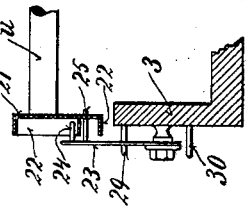
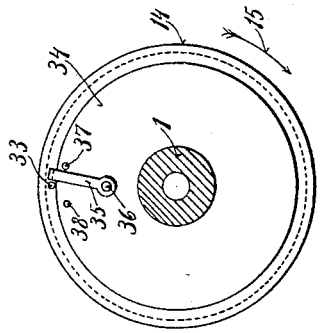
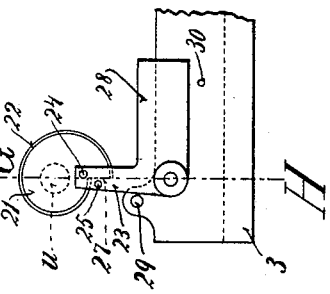
WITNESSES:
INVENTOR
Jacob C. Hansen-Ellehammer
BY
ATTORNEYS No. 766,035. PATENTED JULY 26, 1904.
J. C. HANSEN-ELLEHAMMER.
MACHINE FOR MAKING CIGARETTE TUBES.
APPLICATION FILED JAN. 25, 1902.
NO MODEL. 5 SHEETS—SHEET 5.
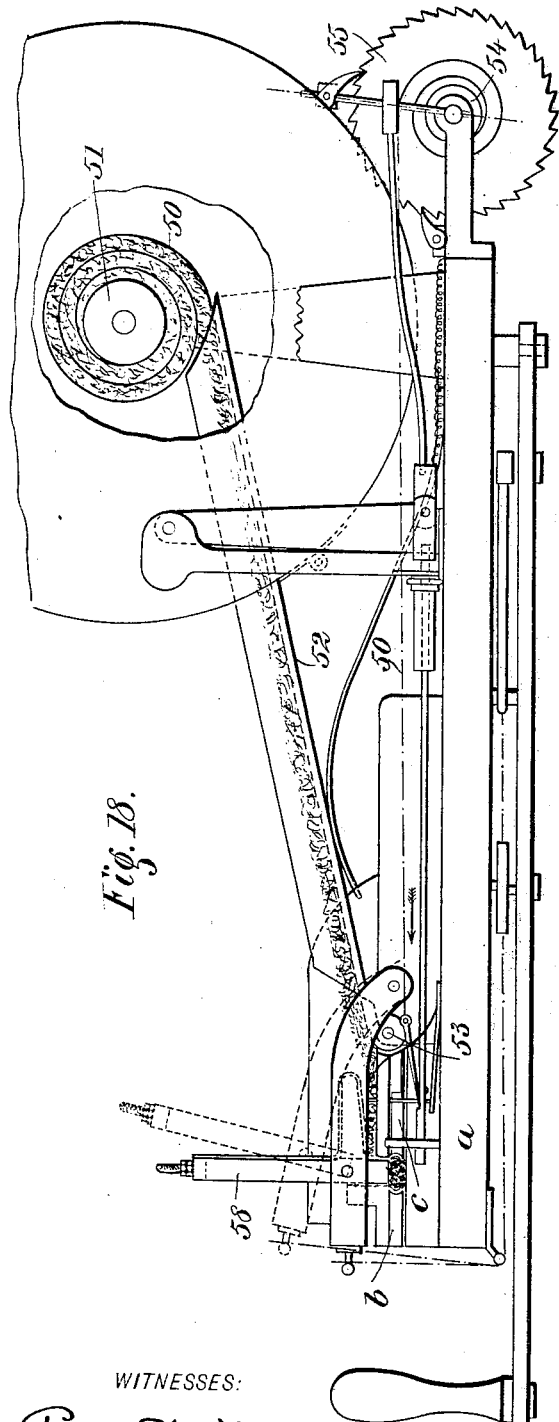
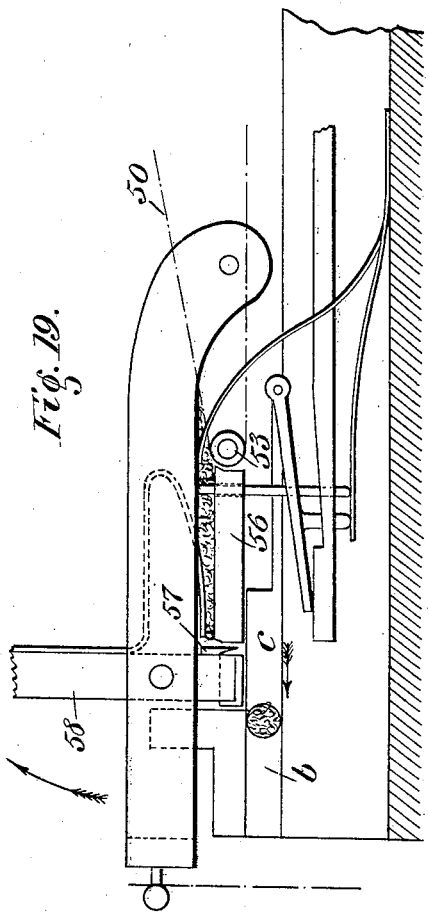
WITNESSES:
INVENTOR
Jacob C. Hansen-Ellehammer
BY
ATTORNEYS.

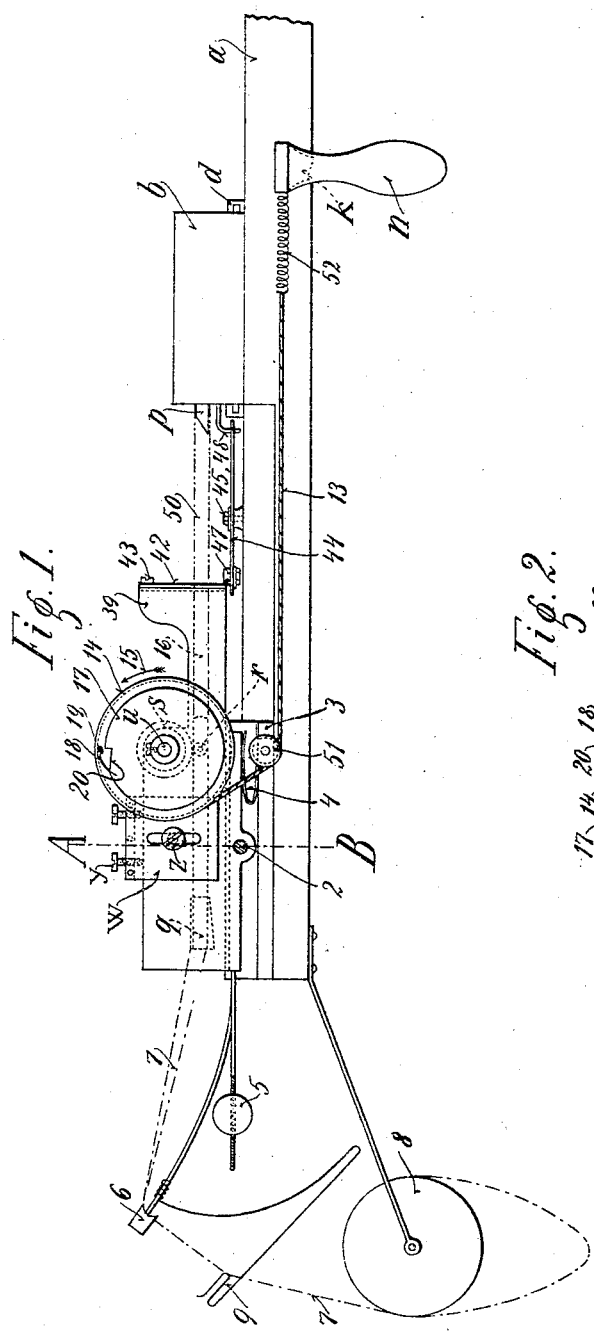

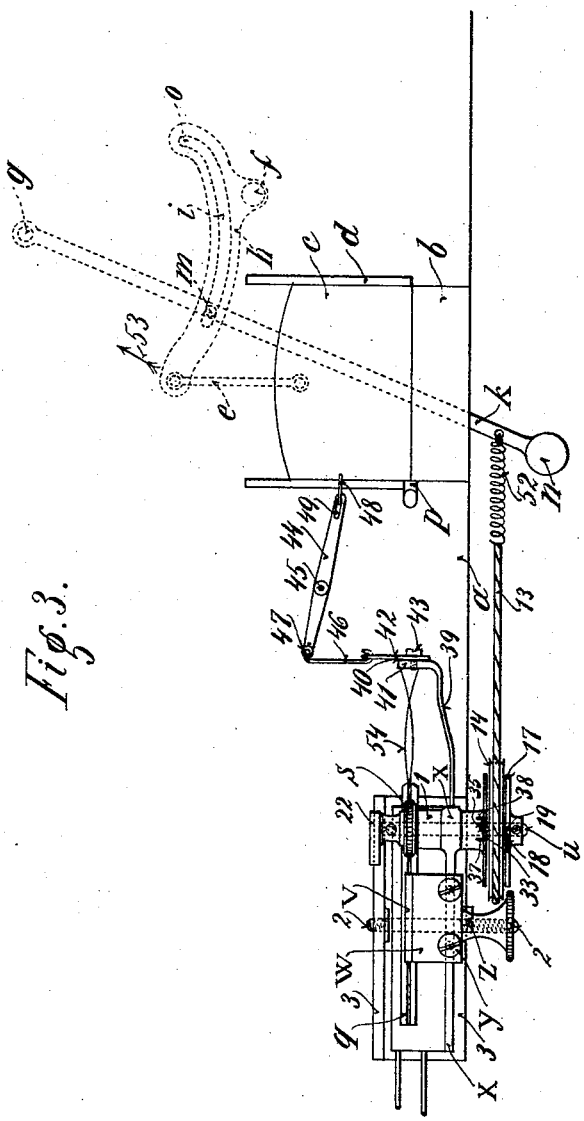

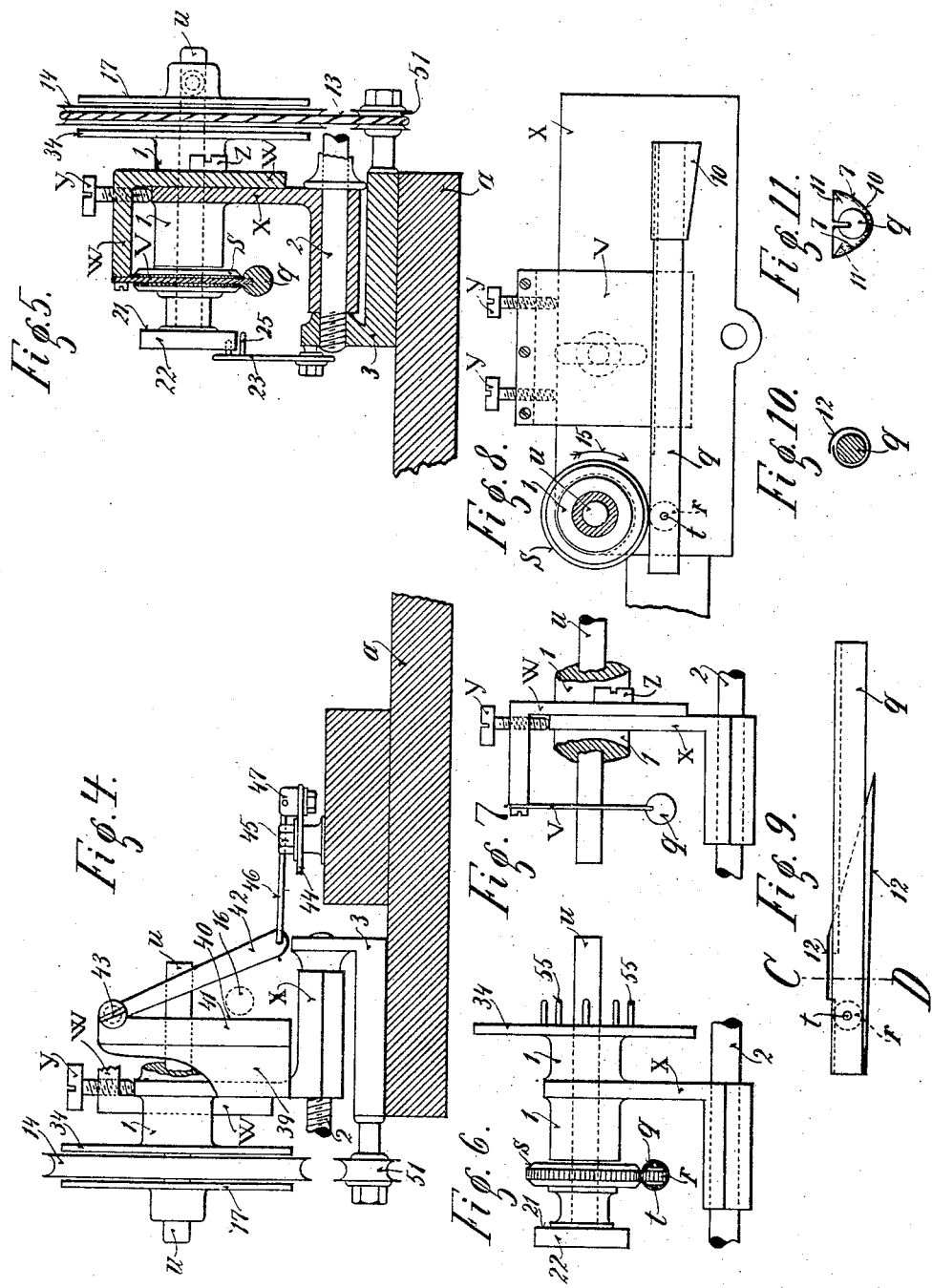

No. 766,035. Patented July 26, 1904.

UNITED STATES PATENT OFFICE.

JACOB CHRISTIAN HANSEN-ELLEHAMMER, OF COPENHAGEN, DENMARK.

MACHINE FOR MAKING CIGARETTE-TUBES.

SPECIFICATION forming part of Letters Patent No. 766,035, dated July 26, 1904.

Application filed January 25, 1902. Serial No. 91,220. (No model.)

*To all whom it may concern:*

Be it known that I, JACOB CHRISTIAN HANSEN-ELLEHAMMER, mechanical engineer, residing at 99 Istedgade, Copenhagen, in the Kingdom of Denmark, have invented certain Improvements in Machines for Making Cigarettes, of which the following is a specification.

In the machines for making cigarettes hitherto known and where the tubes are filled one by one the manufacture of the tubes is generally effected by means of an apparatus placed at a greater or smaller distance from the cigarette-machine, and the tubes must therefore in some way or other be transported from the tube-making apparatus to the cigarette-machine.

The aim of the present invention is to avoid all intermediate stages between the tube-making and tube-filling device, which result is obtained by making the tube-filling apparatus movable either upward or sidewise and capable of placing the tube simultaneously with the folding of the paper direct onto the outlet-spout of the tube-filling device. When the paper tube after having been placed upon the said spout is cut off to its proper length, the tube-making apparatus is automatically moved out of the way, leaving the paper tube free on the spout. The tube is now filled and removed, whereupon the tube-making apparatus is moved back to its first position ready for the next cigarette. This arrangement may be used for tubes whose edges are connected by folding, as well as for tubes whose edges are stuck together by means of an agglutinant.

The accompanying drawings illustrate a constructional form for a tube-filling apparatus of the said kind and where the edges of the tubes are in known manner connected by folding.

Figures 1 and 2 show the device in side elevation in two different positions. Fig. 3 shows the same seen in top plan view. Fig. 4 represents the same in end elevation. Fig. 5 is a section on the line A B of Fig. 1, and Figs. 6 to 17 are details. Figs. 18 and 19 are detail views of a tobacco-filler mechanism adapted to supply a length of filler tobacco to the molds which operate to place the tobacco filler in the tube.

$a$ is a table upon which are placed the molds $b$ and $c$; $b$ is fixed, while $c$ is capable of moving along guide-rails $d$ by means of a rod $e$, which is connected with a lever $h$, fulcrumed on a fixed pin $f$ and provided with a slot $i$. A pin $m$ upon the lever $k$ glides in the slot $i$. When the lever $k$ with its handle $n$ is moved to the right about its pivot $g$, Fig. 3, the pin $m$ glides in the slot $i$, which for a portion of its length is concentric with the pin $g$, on which the lever $k$ can be turned. During this part of the movement of the lever $k$, therefore, the lever $h$ and the mold $c$ will remain quiet. The right end $o$ of the slot $i$ varies in a suitable manner from the above-mentioned concentric arrangement, and when the pin $m$ glides into this part of the slot the lever $h$ will swing around the pin $f$ and the mold $c$ moves away from the mold $b$. When the handle $n$ is moved to the left, the above-described movements will take place in reversed order.

The fixed mold $b$ carries the spout $p$, upon which the cigarette-tubes are pushed when they are to be filled.

The tubes are made by means of a mandrel $q$ and two rollers $r$ and $s$, Figs. 6, 8, and 9. The roller $r$ has exactly the same diameter as the mandrel $q$ and is located in a slot therein, it being revoluble on a spindle $t$. The roller $s$ is fixedly mounted upon a revolving shaft $u$ and arranged so as only to touch the roller $r$. The rollers $r$ and $s$ are provided with fluted peripheries to afford good gripping engagement with the paper.

The mandrel $q$ is attached to a plate $v$, which in its turn is fixed to an angle-piece $w$, Figs. 5, 7, and 8. This latter plate $w$ is mounted upon an angle-shaped plate $x$ and can be suitably adjusted in a vertical direction by means of screws $y$ and held in position by means of a screw $z$. By raising or lowering the angle-piece $w$ the mandrel $q$ and the roller $r$ may be adjusted with relation to the roller $s$, whose axle rests in bearings $l$ in the plate $x$.

The plate $x$ is arranged so as to be capable of turning upon an axle 2, carried by a bracket 3, firmly fixed to the table $a$. When the plate $x$ is turned to bring the mandrel $q$ into a horizontal position, said mandrel will be exactly level with and in front of the spout $p$. In this position of the plate $x$, Fig. 1, a spring 4 between the plate and the bracket 3 is compressed. The rear end of the plate $x$ carries an adjustable weight 5 and a fork 6, which serves to guide the paper band 7, from which the cigarette-tubes are made. The paper is wound upon a revolving drum 8, from which it is led over a very elastic fork 9 and then over the guiding-fork 6 to a cornet-shaped funnel 10 upon the rear end of the mandrel $q$, Figs. 8 and 11. This funnel has on the inside two guiding-surfaces 11, along which the edges of the paper band 7 are adapted to slide and which serve to bend the edges of the paper band around the mandrel $q$ before the paper is received into a still narrower funnel 12, placed upon the mandrel $q$ in front of the rollers $s$ and $r$.

The edges of the funnel 12 are somewhat overlapping, as shown in Fig. 10, which is a section on the line C D of Fig. 9. The edges of the paper band 7 are thereby bent over each other before they reach the rollers $r$ and $s$, and by being pressed together in passing between these rollers the paper band 7 will form a tube 16, from which the suitable lengths are cut.

The shaft $u$, carrying the roller $s$, which is adapted to advance the paper band 7, is mounted in bearings $l$ upon the plate $x$ and is turned by means of a cord 13 or the like, wound around a rope-pulley 14, the latter being mounted on the shaft $u$ in such a manner that said rope-pulley turns when the shaft itself is turned in the direction indicated by the arrow 15 by means of the cord 13, while said pulley will run loosely on the shaft $u$ when the pulley is moved in the opposite direction. The cord 13 is connected with the lever $k$ in such a manner that the advancing movement of the formed tube 16 is accomplished by the same movement of the lever $k$ which sets the other parts of the machine at work. The connection between the pulley 14 and the shaft $u$ is made by means of a disk 17, firmly fixed upon the shaft and provided with an elastic pawl 18, which is capable of catching against a pin 19 upon the pulley 14. When the pulley 14 is turned in the direction indicated by the arrow 15, the pin 19 will strike against the pawl 18, and thus turn the disk 17 and the shaft $u$. When, however, the pulley 14 is turned the opposite way, the pin 19 is free to pass over the elastic pawl 18 by pressing it down into a groove 20 in the disk 17.

The movement of the plate $x$ around the axle 2 is guided by means of the following contrivance: Upon the rear end of the shaft $u$ is firmly mounted a disk forming a cam 21, (see Figs. 3, 5, 15, 16, and 17,) which disk is caused to turn with the shaft $u$. This cam 21 is provided with a spiral-shaped edge 22, forming an open curve. Alongside the cam 21 is arranged a rocking angle-lever, one arm 23 of which lever carries two pins 24 and 25, which encompass the edge 22 of the cam. (See Fig. 17, which is a section on the line G H of Fig. 16.)

When the plate $x$ occupies the position shown in Fig. 2, the cam 21 assumes the position shown in Fig. 15, in which the pins 24 and 25 encompass the outermost part of the edge 22. The shaft $u$ is turned in the direction indicated by the arrow 26 in Fig. 15, and the edge 22 will consequently travel between the two pins 24 and 25. Owing to the peculiar shape of the edge 22, the cam 21 is adapted to pull the shaft $u$ downward until the cam assumes the position shown in Fig. 16, in which position the pins encompass the innermost end of the edge 22 of said cam, and at this time the plate $x$ assumes the position shown in Fig. 1. As soon as the pin 24 passes outside the edge 22 of the cam the latter is released, and thereupon the cam 21, with the shaft $u$ and the plate $x$, will under the action of the spring 4 move upwardly, the long pin 25 traveling along the radial edge 27 of the cam 21 until the edge 22 is caught by the pin 24 at the moment that the plate $x$ again assumes the position shown in Fig. 2, whereupon the angle-lever, actuated by the heavy arm 28, falls over into the position shown in Fig. 15, in which position the pin 25 is outside the edge 22 of the cam. Two pins 29 and 30 limit the movement of the angle-lever, the arms of which are indicated by 23 28.

The above-described means for guiding the movement of the plate $x$ around the axle 2 renders it necessary for the shaft $u$ to make a complete revolution while the plate $x$ swings once up and down, and as the swinging of the plate $x$ takes place each time a new cigarette-tube is placed upon the spout $p$ the circumference of the roller $s$, which is turned together with the cam 21, must be exactly equal to the length of one cigarette-tube. As the shaft $u$ is turned by the rope-pulley 14 the latter must consequently also make exactly one revolution for each swinging movement of the plate $x$ back and forth.

The rope-pulley 14 is loosely mounted upon the shaft $u$. (See Figs. 13 and 14, the latter being a section on the line E F of Fig. 13.) The pulley 14 is provided with a cavity 31, in which is lodged a spiral spring 32, whose ends are fastened, respectively, to one of a series of pins 55 upon the flange 34 and to the pulley 14. The spring 32 is mounted in such a manner that it is tightened when the rope-pulley is turned in the direction of the arrow 15, during which turning movement of the rope-pulley the shaft $u$ is rotated on its axis. When the cord 13 is slackened, the spring 32 will turn the rope-pulley in the opposite direction; but the pulley does not turn the shaft $u$ when it turns in the described backward direction.

In order to limit the rotary movement of the rope-pulley, a pin 33 is fixed on the inner side of the pulley, Figs. 3 and 12, which pin strikes against a stop 35 upon the flange 34. As the pin 33 is intended to arrest the turning of the rope-pulley exactly in the same place when it turns in either direction, the stop 35 is pivoted on a pin 36, carried on the pulley 34, (see Fig. 12,) and the adjustment of the stop is limited by two pins 37 and 38, secured to the flange 34. The plate $x$ carries a projecting arm 39, which is provided with a flange 41, which is provided with a sharp edge 40, that forms a knife, the latter being disposed close to the path of the rolled tube 16 when it is pushed forward by the movement of the rollers.

The flange 41 carries a knife 42, which is pivoted by a pin 43, Figs. 1 to 4, and this knife is connected with the one arm of a double lever 44, fulcrumed on a pin 45 upon the table $a$, the other arm of the lever 44 being connected to the movable mold $c$.

The connection between the lever 44 and the knife 42 is effected by means of a rod 46, hooked into a hole in the knife 42 and having its other end fixed in a block 47, capable of turning upon the lever 44. The rod 46 can consequently turn freely in all directions without in any way impeding the movement of the knife, which is carried by the arm 39.

The connection between the lever 44 and the mold $c$ is effected by means of a pin 48, fixed on the mold and projecting into a slot 49 in the lever 44. The machine works in the following manner: Starting from the position shown in Fig. 2, in which the lever $k$ is supposed to be moved to the right, the cord 13 passes over a guide-pulley 51 and turns the rope-pulley in the direction indicated by the arrow 15. The rope-pulley, by means of the pin 19 and the pawl 18, turns the disk 17 and the shaft $u$, whereby the roller $s$ will be turned, and this roll $s$ coöperates with the roller $r$ to roll the edges of the paper band 7. At the same time the finished paper tube will be pushed out over the edges of the two knives 41 and 42, which have just severed the finished cigarette-tube fed thereto and to the spout $p$. By an inspection of Figs. 3 and 4 it will be evident that the shear-cutter formed by the knives 41 and 42 are open during the movement to the right of the lever $k$, the pin $m$ traveling in the curved slot $i$, whereby the mold $c$ is held in the closed position. The shear-cutter 41 42 will consequently not be in the way of the paper tube 16 when it is being pushed forward. When the shaft $u$ turns, the edge 22 of the cam 21 passes between the pins 24 and 25 as said cam moves in the direction of the arrow 26 in Fig. 15. During the period that the first part of the cam edge 22 passes between the pins the shaft $u$ slowly sinks down, and during the latter part of the rotation of the cam said shaft will assume and remain in the position shown in Fig. 1, in which the tube 16 is exactly in front of the spout $p$, onto which it is adapted to be pushed. The shear-cutter 41 42 remains in the open position, the pin $m$ still moving in the curved slot $i$ of the lever. When the tube 16 is pushed completely upon the spout $p$, the rotation of the roller $s$ is arrested by the pin 33, Fig. 12, on the rope-pulley striking against the stop 35, and this stop is carried over against the pin 37 upon the fixed disk 34. The handle $n$ and the lever $k$, however, still move a little to the right, which movement is rendered possible by a spring 52, inserted between the cord 13 and the lever $k$. During this latter part of the movement of the lever $k$ the pin $m$ moves in the slot $o$, and the lever $h$ will therefore turn in the direction indicated by the arrow 53, Fig. 3. The mold $c$ moves away from the mold $b$, thereby turning the lever 44 and carrying the knife 42 over toward the knife 41, so that the tube 16 between the shear-cutter is severed and the prepared cigarette-tube 50 remains upon the spout $p$. The plate $x$ remains in the position shown in Fig. 1, in which it is held by the stretched cord 13, the point of pull of said cord being in front of the axle 2. When the handle $n$ is again moved to the left, the pin $m$ travels in the slot $o$ and turns the lever $h$ backwardly, so that the mold $c$ is closed and the cutter 41 42 is opened, while the spring 52 contracts. The plate $x$ will now return to the position shown in Fig. 2, because it is actuated partly by the spring 4 and partly by the weight 5. The pins 24 and 25 do not prevent this rocking movement of the plate $x$, as they occupy the position shown in Fig. 16 with relation to the edge 22 of the the cam 21. During the further movement to the left of the handle $n$ the rope-pulley 14 is turned in the direction opposite to the one indicated by the arrow 15, said rope-pulley being actuated by the spring 32. This turning of the rope-pulley will continue without turning the shaft $u$ until the pin 33 again strikes against the stop 35 and carries the latter over toward the pin 38. The rope-pulley 14 has now turned back a complete revolution and is again in its normal position, in which the pin 19 bears against the pawl 18. While the rope-pulley 14 is turning backward, the cigarette-tube 50 is perfectly free and can be filled with tobacco and removed by suitable appliances which are not contemplated by the present invention, such filling and removal of the cigarette being effected before the plate $x$ and the new tube 16 again assume the position in front of the spout $p$.

In order to prevent the edges of the front end of the tube 16 from sticking together after it shall have been severed by the cutter, so that the tube can not slide upon the spout $p$, the front end of the mandrel $q$ is provided with two elastic wires 54 or the like, whose extreme front ends just reach the shears 41

42. During the operation of cutting the tube the points of the wires are bent toward each other; but as soon as the cutting of the tube 16 takes place the wires will, on account of their elasticity, move apart, and thus open the closed ends of the tube.

The lever $k$ can be moved by hand through means of the handle $n$; but it may as a matter of course also be moved by the means of a motor.

Any suitable type of tube-filler mechanism may be employed to place the charge or filler of tobacco in the completed paper tube—such, for example, as those previously patented by me in Patents Nos. 700,040 and 702,206.

To enable others to understand the present invention, I have shown the relation of certain parts of the tube-filling mechanism to my present improvements by Figs. 1, 2, 3, 18, and 19 of the drawings, wherein the tobacco-filler molds are indicated at $b\ c$. The tobacco is conveyed to the molds by an apron 50, which is coiled on a drum 51 and is led over an inclined table 52. This apron passes around a guide-sheave 53, and it is led in a backward direction to a spool or drum 54, on which the end of the apron is adapted to be coiled, owing to the rotation of said drum by a suitable pawl-and-ratchet feed mechanism, (indicated partly at 55 in Fig. 18.) The tobacco is discharged from the apron 50 onto a table 56 when said apron 50 passes around the roller 53, as shown by Fig. 19. The tobacco filler is advanced across the table 56 into the path of the knife 57, which is carried by a vertically-movable plunger 58, and when the molds $b\ c$ are opened this plunger is operated by suitable mechanism, so as to lower the knife 57, thereby cutting off a proper quantity of tobacco to form a charge from the layer of tobacco advanced by the apron across the table. Said charge of tobacco is forced by the plunger into the molds, and when the latter are closed the tobacco charge is shaped and pressed ready for delivery into the spout $p$, by which the charge is directed into the paper tube.

Having now particularly described the nature of the said invention and in what manner the same is to be performed, I declare that what I claim is—

1. In a machine for making cigarettes, the combination with a filling mechanism, of a tube-forming mechanism movable as a whole to a position in register with said filling mechanism, and means for shifting the tube-forming mechanism to a disalined or non-registering position relative to said tube-filling mechanism.

2. In a machine for making cigarettes, the combination with a filling mechanism, of a tube-forming mechanism shiftable to positions into and out of register with said filling mechanism and tube-feeding mechanism operable to advance the tube with respect to the tube-forming mechanism when the latter is in register with said filling mechanism.

3. In a machine for making cigarettes, the combination with a filling mechanism, of a shiftable carrier arranged adjacent to said filling mechanism, a tube-forming mechanism mounted on and shiftable with said carrier, and means whereby the carrier may be shifted back and forth and adjusted to bring the tube-forming mechanism into register with said filling mechanism.

4. In a machine for making cigarettes, the combination with a filling mechanism, of a shiftable carrier, a tube-forming mechanism mounted on said carrier, and a tube-feeding mechanism occupying normally an operative relation to the tube-forming mechanism; said forming and feeding mechanisms being shiftable with the carrier to advance a completed tube to said filling mechanism at the proper time.

5. In a machine for making cigarettes, the combination with a filling mechanism, of a pivotally-mounted carrier shiftable with relation to said filling mechanism, and a complete tube forming and a feeding device supported on said carrier.

6. In a machine for making cigarettes, the combination with a filling mechanism, of a rocking carrier mounted to turn on a horizontal axis and disposed adjacent to said filling mechanism, a tube-forming mechanism on said carrier, a tube-feeding mechanism, means for operating said tube-feeding mechanism, and means for automatically rocking said carrier and the devices supported thereon.

7. In a machine for making cigarettes, the combination with a filling mechanism, of a shiftable carrier, tube forming and feeding devices mounted on said carrier, means for operating the tube-feeding device, and a cam driven from a part of the tube-feeding devices and having operative connection with said carrier to automatically change the position of the latter and means for operating the filling mechanism to fill the tube.

In testimony that I claim the foregoing as my invention I have signed my name in presence of two subscribing witnesses.

JACOB CHRISTIAN HANSEN-ELLEHAMMER.

Witnesses:
S. HOFMAN BANG,
J. C. JACOBSEN.